US012582019B2

(12) United States Patent
Palmer et al.

(10) Patent No.: US 12,582,019 B2
(45) Date of Patent: Mar. 24, 2026

(54) MOBILE AUTONOMOUS AGRICULTURAL SYSTEM

(71) Applicant: S&A GROUP HOLDINGS LIMITED, Hereford (GB)

(72) Inventors: Edward John Francis Palmer, Herefordshire (GB); Jithesh Kotteri, Cawston Rugby (GB); Austin William Owens, Pembridge Leominster (GB); Daniel John Owen Perrett, Monmouth (GB)

(73) Assignee: S&A GROUP HOLDINGS LIMITED, Hereford (GB)

( * ) Notice: Subject to any disclaimer, the term of this patent is extended or adjusted under 35 U.S.C. 154(b) by 333 days.

(21) Appl. No.: 18/171,766

(22) Filed: Feb. 21, 2023

(65) Prior Publication Data

US 2023/0292644 A1     Sep. 21, 2023

(30) Foreign Application Priority Data

Mar. 18, 2022     (GB) ...................................... 2203843

(51) Int. Cl.
*A01B 69/04*          (2006.01)
*G01S 7/48*           (2006.01)
(Continued)

(52) U.S. Cl.
CPC .......... *A01B 69/008* (2013.01); *G01S 7/4808* (2013.01); *G01S 17/88* (2013.01); *G05D 1/0212* (2013.01); *G05D 1/0238* (2013.01)

(58) Field of Classification Search
None
See application file for complete search history.

(56) References Cited

U.S. PATENT DOCUMENTS

2011/0073026 A1     3/2011   Martin
2013/0118391 A1     5/2013   Gadzella et al.
(Continued)

FOREIGN PATENT DOCUMENTS

CN       111645478       5/2021
EP       3987899 A1      4/2022
WO       2010020607 A1   2/2010

OTHER PUBLICATIONS

Canadian Office Action dated Sep. 20, 2024 in co-pending Canadian Application No. 3,194,935.
(Continued)

*Primary Examiner* — Peter D Nolan
*Assistant Examiner* — Jacob Kent Besteman-Street
(74) *Attorney, Agent, or Firm* — Perilla Knox & Hildebrandt LLP

(57)          ABSTRACT

There is disclosed a mobile autonomous agricultural system comprising a powered mobile unit, two distance sensors, an attitude sensor, a path determination module and a controller. The powered mobile unit extends from a front end to a back end along a longitudinal axis, and is configured for carrying agricultural equipment and to move along rows of posts along the longitudinal axis. The powered mobile unit comprises a chassis supported by wheel units, each wheel unit comprising a wheel with a suspension assembly. The suspension assembly comprises a suspension unit comprising passive spring around a shock absorber coupled to the wheel, and a linear actuator configured to move the suspension unit relative to the chassis of the mobile unit to thereby move the wheel relative to the chassis independently of the suspension unit. The two distance sensors are disposed on the powered mobile unit, and each configured to sense external objects within two dimensions and the distance of the external objects from the respective distance sensors in opposing front and back directions along the longitudinal
(Continued)

axis. The attitude sensor is configured to determine the attitude of the powered mobile unit with respect to the horizontal. The path determination module is configured to: receive distance signals from the distance sensors, identify a row of posts based on the distance signals; and generate a motion trajectory, based on the identified row of posts, for the powered mobile unit to follow. The controller is configured to control the linear extension of the linear actuator of the suspension assembly and the direction of travel of the mobile unit based on the motion trajectory of the path determination module and an output of the attitude sensor, to follow the row of posts and to maintain a horizontal attitude of the powered mobile unit whilst maintaining contact of the wheels with the ground.

21 Claims, 5 Drawing Sheets

(51) Int. Cl.
  G01S 17/88 (2006.01)
  G05D 1/00 (2006.01)

(56) References Cited

U.S. PATENT DOCUMENTS

| | | | |
|---|---|---|---|
| 2014/0371985 A1 | 12/2014 | Tseng et al. | |
| 2015/0352921 A1* | 12/2015 | Dames | B60G 3/20 |
| | | | 280/5.514 |
| 2016/0096407 A1 | 4/2016 | Dames | |
| 2016/0096550 A1* | 4/2016 | Dames | B62D 7/142 |
| | | | 280/86.758 |
| 2017/0015174 A1 | 1/2017 | Ruppert | |
| 2017/0203628 A1* | 7/2017 | Dames | B60G 7/001 |
| 2018/0373264 A1* | 12/2018 | Madsen | G05D 1/0088 |
| 2019/0090472 A1* | 3/2019 | Crinklaw | G05D 1/223 |
| 2019/0315183 A1* | 10/2019 | Ducroquet | B60G 21/007 |
| 2020/0029489 A1 | 1/2020 | Bertucci et al. | |
| 2020/0207171 A1 | 7/2020 | Bosschieter et al. | |
| 2022/0408629 A1* | 12/2022 | Suzuki | G05D 1/6484 |
| 2023/0059246 A1* | 2/2023 | Palmer | A01D 75/185 |
| 2024/0397871 A1* | 12/2024 | Palmer | A01D 46/30 |

OTHER PUBLICATIONS

Search Report for GB2203843.4; Sep. 21, 2022; 3 pgs.
UK Search Report dated May 21, 2025 in co-pending GB Patent Application No. GB2203843.4.
European Search Report dated May 8, 2025 in European Patent Application No. EP 25155102.4.
Canadian Office Action dated Jul. 31, 2025 in Canadian Patent Application No. 3,194,935.
Australian Examination Report No. 2 dated Jul. 24, 2025 in Australian Patent Application No. 2023201664.

* cited by examiner

100

300

302 — Receive attitude signal

304 — deviation of attitude from the horizontal?

no yes

306 — Control linear extension of linear actuators

200

202 — Receive proximity signal

204 — Determine the location of the mobile unit

206 — Control movement of the mobile unit based on the location

MOBILE AUTONOMOUS AGRICULTURAL SYSTEM

CROSS-REFERENCE TO RELATED APPLICATION

This application claims the benefit of GB Patent Application Serial No. 2203843.4 filed Mar. 18, 2022, the entirety of which is hereby incorporated herein by reference for all purposes.

FIELD OF INVENTION

The present invention relates to a mobile autonomous agricultural system and a method of controlling the same.

BACKGROUND

Many agricultural tasks to improve yield and quality of crops, or to harvest crops, (particularly soft fruit crops) require time consuming manual labour. However, many of the tasks required are repetitive and may therefore be suitable for help by autonomous machinery. Such autonomous machinery would typically be required to autonomously move around and between crops around uneven and unpredictable terrain.

SUMMARY

According to a first aspect, there is provided a mobile autonomous agricultural system comprising: a powered mobile unit extending from a front end to a back end along a longitudinal axis, the powered mobile unit configured for carrying agricultural equipment and, configured to move along rows of posts along the longitudinal axis, the powered mobile unit comprising a chassis supported by wheel units, each wheel unit comprising a wheel with a suspension assembly, wherein the suspension assembly comprises a suspension unit comprising passive spring around a shock absorber coupled to the wheel, and a linear actuator configured to move the suspension unit relative to the chassis of the mobile unit to thereby move the wheel relative to the chassis independently of the suspension unit; two distance sensors disposed on the powered mobile unit, each configured to sense external objects within two dimensions and the distance of the external objects from the respective distance sensors in opposing front and back directions along the longitudinal axis; an attitude sensor configured to determine the attitude of the powered mobile unit with respect to the horizontal; a path determination module configured to: receive distance signals from the distance sensors, identify a row of posts based on the distance signals; and generate a motion trajectory, based on the identified row of posts, for the powered mobile unit to follow; and a controller configured to control the linear extension of the linear actuator of the suspension assembly and the direction of travel of the mobile unit based on motion trajectory of the path determination module and an output of the attitude sensor, to follow the row of posts and to maintain a horizontal attitude of the powered mobile unit whilst maintaining contact of the wheels with the ground.

The distance sensors may each be two-dimensional LIDAR sensors. The distance sensors may be disposed on the chassis of the powered mobile unit at least 40 cm from the ground and angled with a downward component.

The path determination module may be configured to identify a row of posts from a plurality of data points received from the distance sensors using a line fitting algorithm to derive a best fit line representing the identified row of posts. The line fitting algorithm may be a RANSAC line fitting algorithm.

The path determination module may generate a motion trajectory based on the best fit line. The path determination module may be configured to smooth out a dynamically changing best fit line, to generation the motion trajectory.

The path determination module may be configured to filter data points from the received signals based on at least one of:
reflection intensity of data points;
isolation of data point clusters from other data points;
consistency of data points with an identified row of posts; and
data point cluster size.

The data points may be filtered to exclude those points which exceed a reflection intensity threshold. The data points may be filtered to exclude those points which are below a second reflection intensity threshold. The data points may be filtered to exclude those data points which are in an isolated cluster. The data points may be filtered to exclude those data points which are inconsistent with an identified row of posts. The data points may be filtered to exclude data point clusters which are outside of a cluster size range.

The mobile autonomous agricultural system may further comprise a proximity sensor disposed on the chassis of the powered mobile unit. The proximity sensor may be configured to point towards a row of posts along which the chassis is configured to move.

The proximity sensor may be positioned on the chassis at an upper part which is configured to extend above the row of posts when the chassis moves along the row of posts, and wherein the proximity sensor is disposed on the upper part of the powered mobile unit, and configured to point towards the ground, thereby pointing towards the row of posts when the powered mobile unit moves along the row of posts.

The controller may be configured to identify an end and/or a beginning of the row of posts based on a proximity signal received from the proximity sensor. When the end of a row is identified, the controller may be configured to control the powered mobile unit to exit the respective row based on the motion trajectory and then to control the powered mobile unit to move towards another row based on a GPS signal or a predefined map of rows, and/or when the beginning of a row is identified, the controller may be configured to control the powered mobile unit to move into the row according to the motion trajectory.

The suspension assembly may further comprise a four-bar linkage comprising a base, an input link, a coupler link and a follower link with the base and the coupler link on opposing sides of the four-bar linkage. The wheel may be fixed to the coupler link. The linear actuator may be coupled between the base and the input link such that extension of the linear actuator moves the coupler link, and thereby the wheel, away from the chassis and retraction of the linear actuator moves the coupler link, and thereby the wheel, towards the chassis.

The attitude sensor may be a gyroscopic sensor disposed on the chassis of the powered mobile unit and configured to monitor deviation of the attitude of the powered mobile unit from the horizontal. The gyroscopic sensor may be a micro-chipped packaged microelectromechanical system gyroscope (MEMS gyroscope).

The controller may be configured to control the linear actuators to maintain a centre of the mobile unit at a controlled predetermined height from the ground.

The wheel of each wheel unit may be simultaneously independently controllable for rotation of the wheel for speed and the pivoting of the wheel for steering of each wheel unit independently whilst maintaining the horizontal attitude of the mobile unit and controlling the direction of travel of the mobile unit in real time.

According to a second aspect, there is provided a method of controlling a mobile autonomous agricultural system according to the first aspect, the method comprising: receiving distance signals from the distance sensors and an output from the attitude sensor, identifying a row of posts based on the distance signals; generating a motion trajectory, based on the identified row of posts, for the powered mobile unit to follow; and controlling the direction of travel of the mobile unit and the linear extension of the linear actuator of the suspension assembly based on the motion trajectory of the path determination module and the output of the attitude sensor, to follow the row of posts and to maintain a horizontal attitude of the powered mobile unit whilst maintaining contact of the wheels with the ground.

Identifying the row of posts may comprise receiving a plurality of data points from the distance sensors and using a line fitting algorithm to derive a best fit line representing the identified row of posts.

The motion trajectory may be generated based on the best fit line. The motion trajectory may comprise smoothing out a dynamically changing best fit line.

The method may comprise filtering data points from the received signals based on at least one of:
reflection intensity of data points;
isolation of data point clusters from other data points;
consistency of data points with an identified row of posts; and
data point cluster size.

The method may comprise filtering data points to exclude those points which exceed a reflection intensity threshold. The method may comprise filtering data points to exclude those data points which are in an isolated cluster. The method may comprise filtering data points to exclude those data points which are inconsistent with an identified row of posts. The method may comprise filtering data points to exclude those data point clusters which are outside of a cluster size range.

The method may comprise identifying, based on proximity signals received from the proximity sensor, an end and/or a beginning of a row. When the end of a row has been identified, the method may comprise controlling the powered mobile unit to exit the respective row based on the motion trajectory, and then controlling the powered mobile unit to move towards another row based on a GPS signal or a predefined map of rows; and/or when the beginning of a row is identified, the method may comprise controlling the powered mobile unit to move into the row based on the generated motion trajectory.

The controller may control the linear actuators to maintain a centre of the mobile unit at a controlled predetermined height from the ground.

The method may comprise simultaneously and independent controlling the rotation of the wheel for speed and the pivoting of the wheel for steering of each wheel unit whilst maintaining the horizontal attitude of the mobile unit and controlling the direction of travel of the mobile unit in real time.

According to a third aspect, there is provided a mobile autonomous agricultural system comprising: a powered mobile unit extending from a front end to a back end along a longitudinal axis, the powered mobile unit configured for carrying agricultural equipment and, configured to move along rows of posts along the longitudinal axis; two distance sensors disposed on the powered mobile unit, each configured to sense external objects within two dimensions and the distance of the external objects from the respective distance sensors in opposing front and back directions along the longitudinal axis; a path determination module configured to: receive distance signals from the distance sensors, identify a row of posts based on the distance signals; and generate a motion trajectory, based on the identified row of posts, for the powered mobile unit to follow; and a controller configured to control the direction of travel of the mobile unit based on the motion trajectory of the path determination module to follow the row of posts.

According to a fourth aspect, there is provided a mobile autonomous agricultural system comprising: a powered mobile unit extending from a front end to a back end along a longitudinal axis, the powered mobile unit configured for carrying agricultural equipment and, configured to move along rows of posts along the longitudinal axis, the powered mobile unit comprising a chassis supported by wheel units, each wheel unit comprising a wheel with a suspension assembly, wherein the suspension assembly comprises a suspension unit and a linear actuator, the suspension unit comprising a passive spring around a shock absorber which is coupled to the wheel, and the linear actuator configured to move the suspension unit relative to the chassis of the mobile unit to thereby move the wheel relative to the chassis independently of the suspension unit; an attitude sensor configured to determine the attitude of the powered mobile unit with respect to the horizontal; and a controller configured to control the linear extension of the linear actuator of the suspension assembly based on an output of the attitude sensor, to maintain a horizontal attitude of the powered mobile unit whilst maintaining contact of the wheels with the ground.

The third and fourth aspects may further comprise any of the features of the first and second aspects.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described, by way of example only, with reference to the accompanying Figures, in which.

DETAILED DESCRIPTION OF THE INVENTION

Figure 1:
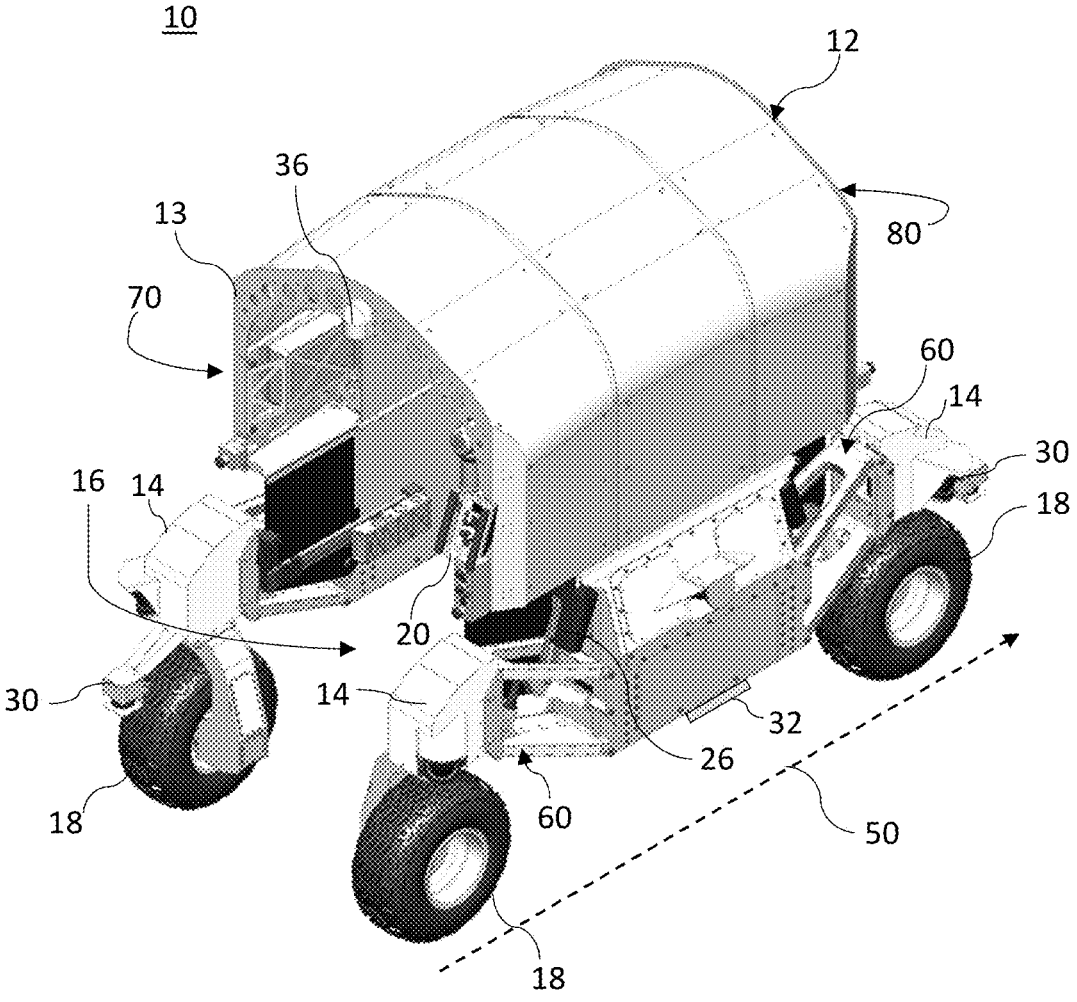
FIG. 1 schematically shows an isometric view of a mobile autonomous agricultural system.
Figure 2:
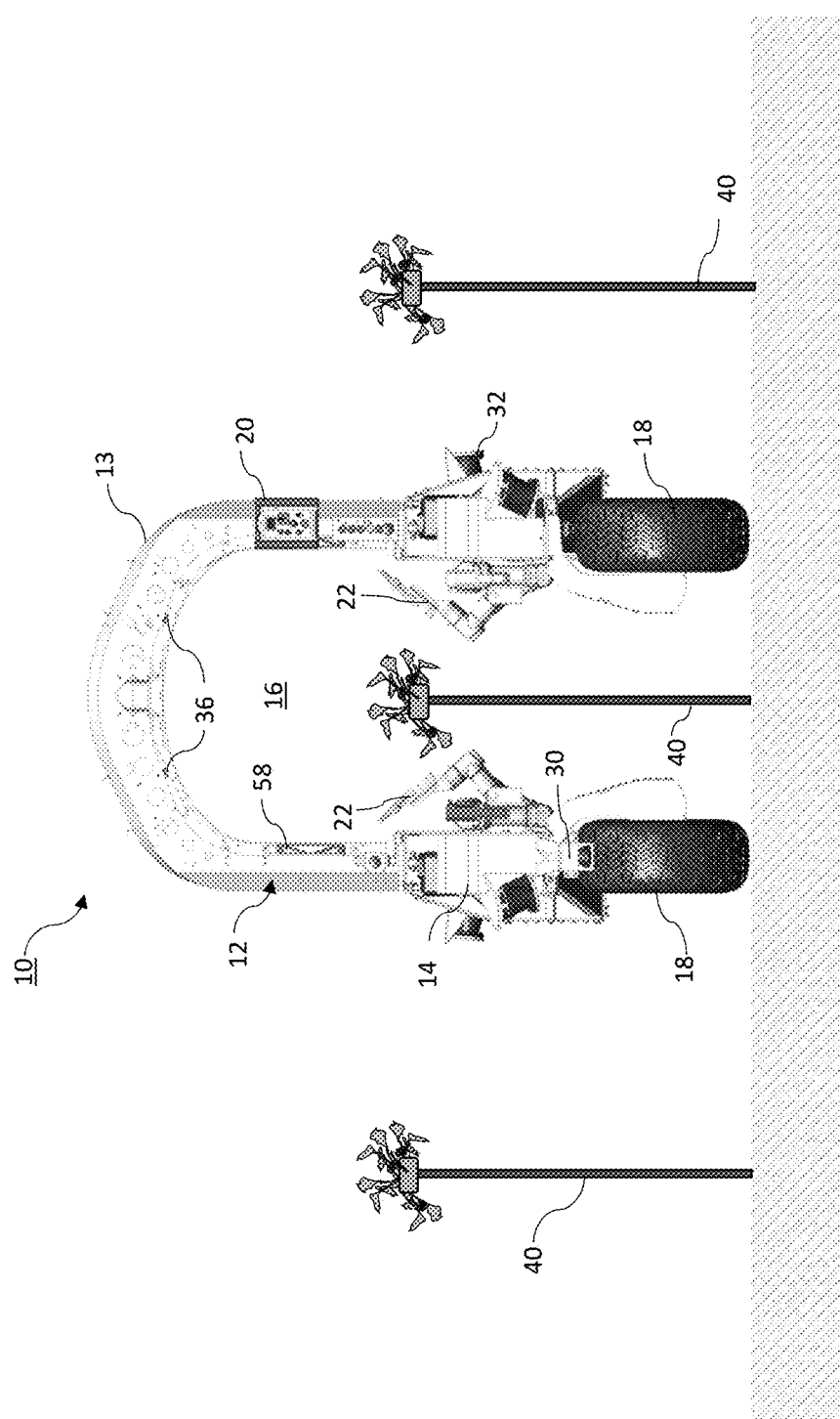
FIG. 2 schematically shows a front view of the mobile autonomous agricultural system of FIG. 1.

FIGS. 1 and 2 show a mobile autonomous agricultural system 10 comprising a powered mobile unit 12 configured for carrying agricultural equipment 22. The mobile autonomous agricultural system 10 is configured to operate along rows 40 of crops (best shown in FIG. 2, with each row 40 shown extending into the page) to perform agricultural tasks, such as harvesting, husbandry, or monitoring the crops. The rows 40 of crops may be disposed on top of posts to elevate them from the ground, which is common, for example, in strawberry farming, and each row 40 may have any length, which may vary from the lengths of other rows 40 on the same site.

The mobile unit 12 extends from a front end 70 to a back end 80 along a longitudinal axis 50. In this example, the mobile unit 12 comprises a chassis 13 having an arch profile extending along the longitudinal axis 50. In other words, at any point along the longitudinal axis 50, a cross section of the mobile unit 12 comprises an arch profile. The mobile unit 12 is therefore configured to move along rows of posts 40 which are aligned with the longitudinal axis 50.

The arch profile of the mobile unit 12 defines an inner zone 16, in the form of a tunnel extending along the longitudinal axis 50, within which agricultural equipment 22 is disposed such that it is protected from damage. The agricultural equipment 22 in this example comprises robot arms. In other examples, it may include UV tubes or any other suitable equipment for carrying out agricultural tasks. The arch profile further allows the mobile unit 12 to traverse along rows 40 of crops, which are raised above the ground on posts (for ease of accessibility), with a single row 40 of crops extending through the inner zone 16 along the longitudinal axis 50. The row 40 is then simultaneously accessible by the agricultural equipment from two sides, and the mobile unit 12 can move along the row 40 without impacting it.

In this example, distal ends of arms of the arch are fixed to powered wheel units 14, each wheel unit 14 comprises a wheel 18 (pivotable with respect to the mobile unit 12 for steering) and a suspension assembly 60 which is described in more detail with reference to FIGS. 3a and 3b. In this example, the wheels 18 of each wheel unit 14 are driven by electrical motors which each have an independently variable speed. Each wheel 18 is also independently pivotable for steering.

The arms of the arch extend away from the wheel units 14 to an apex of the arch. In this example, each distal end of the arch is attached to two wheel units 14, such that the whole arch is supported on the ground by a total of four wheel units 14. It will be appreciated that in other examples, any suitable number of wheel units may be used, or any other suitable device for propelling the mobile unit 12 may be used.

The mobile autonomous agricultural system 10 comprises a controller 20 which is configured to control the direction of travel of the mobile unit 12 and to maintain a horizontal attitude of the mobile unit 12 by controlling the wheel units 14. In this example, in an autonomous mode, the controller 20 is configured to autonomously move the mobile unit 12 along the rows 40 of crops, and between the rows 40, where the rows may comprise a straight line of crops, or any other line of crops with a non-linear profile. In other words, the controller 20 is configured to align the longitudinal axis 50 of the inner zone 16 of the mobile unit 12 with a first row 40 of crops such that the arch profile is centred and aligned with the row 40 of crops, and to move the mobile unit 12 to follow the row. In this example, this includes controlling the mobile unit 12 to approach the first row 40 and to continue to move the mobile unit 12 along the row 40, with the first row 40 received in the inner zone 16 until it reaches an end of the row 40.

In this example, at the end of the row 40, the controller 20 is configured to control the mobile unit 12 to exit the row 40, travel a predetermined distance away from the row 40, and traverse towards an adjacent row 40 to begin the process again with the adjacent row 40. In this example, the mobile autonomous agricultural system 10 may also be operated in a manual mode, in which a user can manually control the movement of the mobile unit 12, for example up to a first row 40, at which point the user may activate the autonomous mode.

In this example, the autonomous mode of the mobile autonomous agricultural system 10 provides for autonomous movement between adjacent rows 40 of crops in a single polytunnel having multiple rows 40 of crops, and also from one polytunnel to another.

It will be appreciated that, in other examples, the controller may be configured to control the mobile unit in any suitable manner to enable use of the mobile unit for a particular application. The specific control of the system 10 in this example is described in more detail with reference to FIGS. 4-6.

Figure 3B:
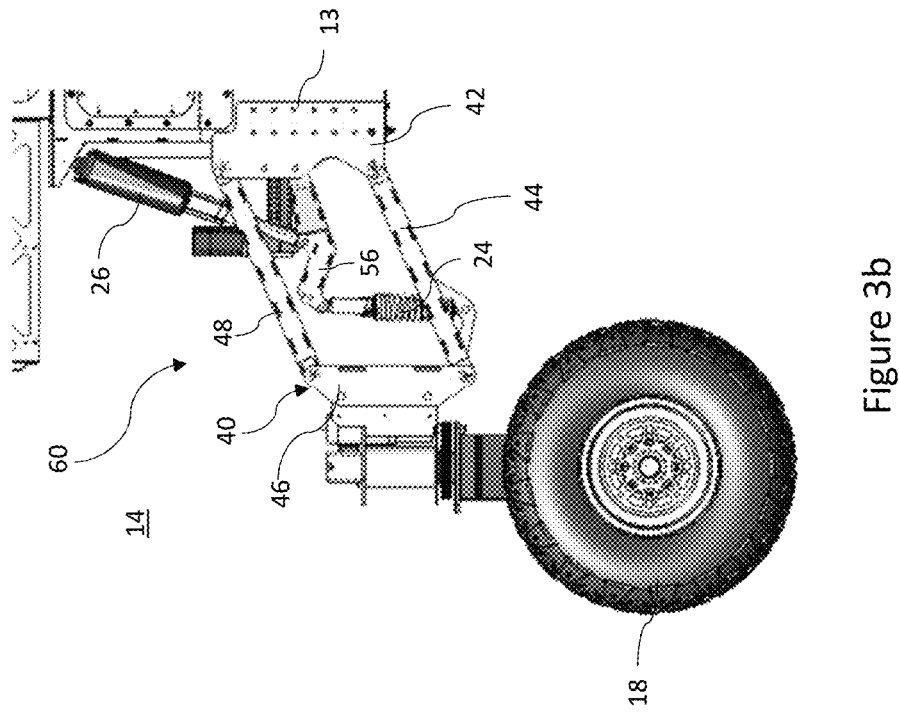
FIGS. 3a and 3b schematically show a side view of a wheel unit of the mobile autonomous agricultural system of FIG. 1 in a retracted configuration and an extended configuration respectively.
Figure 3A:
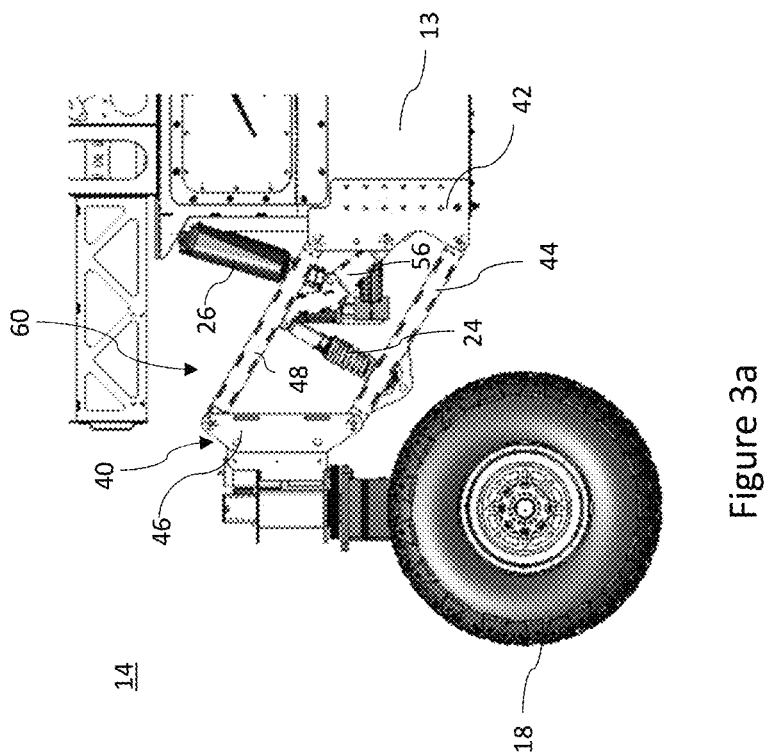

FIGS. 3a and 3b show an example wheel unit 14 in more detail. FIG. 3a shows the wheel unit 14 in a retracted configuration, and FIG. 3b shows the wheel unit 14 in an extended configuration. The suspension assembly 60 comprises a passive suspension unit 24 and an active linear actuator 26 (best seen in FIG. 1). In this example, the suspension unit 24 includes a passive spring disposed around a shock absorber and is coupled to the wheel 18 to dampen shocks and enable some movement of the wheel 18 relative to the chassis 13 to stabilise the mobile 12 unit on uneven ground. In this example, the linear actuator 26 is coupled between the suspension unit 24 and the chassis 13 such that it is configured to move the suspension unit 24 relative to the chassis 13 to thereby move the wheel 18 relative to the chassis 13.

In this example, a lever 56 is pivotably connected, at a proximal end of the lever 56, to the base 42 (i.e., the chassis 13), and is pivotably connected, at a distal end of the lever 56, to the suspension unit 24. The linear actuator 26 is pivotably connected to the lever 56 at a point between the proximal end and the distal end. This arrangement results in the suspension unit 24 moving more than an end of the linear actuator 26 when the linear actuator 26 extends or retracts. Therefore, the linear actuator 26 in this example is indirectly connected to the suspension unit 24. It will be appreciated that, in other examples, the linear actuator may be connected directly to the suspension unit.

The linear actuator 26 acts independently of the suspension unit 24. The linear actuator 26 has a travel between an extended position at which the linear actuator 26 has an extended length, and a retracted position at which the linear actuator 26 has a retracted length smaller than the extended length. The linear actuator 26 being in the retracted position corresponds to the wheel unit 14 being in the retracted configuration, and the linear actuator 26 being in an extended position corresponds to the wheel unit 14 being in the extended configuration.

In this example, the suspension assembly further comprises a four-bar linkage 40. The four-bar linkage 40 comprises a base 42 which is fixed to the chassis 13, an input link 44, a coupler link 46 and a follower link 48. In this example, the input link 44 is pivotably connected between the coupler link 46 and the base 42 such that the coupler link 46 opposes the base 42, and the follower link 48 is pivotably connected between the coupler link 46 and the base 42 on an opposing side of the coupler link 46 and base 42 to the input link 44.

In this example, the wheel 18 is fixed to the coupler link 46. At one end, the suspension unit 24 is pivotably coupled to the input link 44, and at an opposing end the suspension unit 24 is pivotably coupled to the linear actuator 26. The linear actuator 26 in this example is coupled to the base 42 (i.e., the chassis 13) and to the suspension unit 24. Therefore, the linear actuator 26 and the suspension unit 24 are arranged in series in this example between the base 42 (or the chassis 13) and the input link 44. In other words, the linear actuator 26 in this example is indirectly coupled to the input link 44 via the suspension unit 24 and the lever 56. Therefore, retraction of the linear actuator 26 moves the coupler link 46 towards the chassis 13 (as shown in FIG. 3*a*), by means of rotation of the four-bar linkage 40 by rotation of the input link 42, and extension of the linear actuator 26 moves the coupler link 46 away from the chassis 13 (as shown in FIG. 3*b*).

Referring back to FIGS. 1 and 2, the mobile autonomous agricultural system 10 comprises two distance sensors 30 disposed on the mobile unit 12, in this example. In this example, the distance sensors 30 are two-dimensional Light Detection and Ranging (LIDAR) sensors. The two distance sensors 30 are oriented to sense external objects in opposing directions along the longitudinal axis 50 (i.e., in a front direction and in a back direction). In particular, the distance sensors 30 are for detecting posts in the rows 40 of crops.

In this example, the two distance sensors 20 are disposed on the front end 70 and the back end 80 of the mobile unit 12 respectively (FIG. 1 shows the distance sensor only on the front end 70). In other examples, they may be disposed at any suitable location on the mobile unit 12 and any suitable distance above the ground.

In this example, the distance sensors 30 are disposed approximately 50 cm from the ground, and are angled in a direction having a slight downward component. In some examples, the distance sensors 30 may be disposed at least 40 cm from the ground, or at any suitable height.

This height of the distance sensors 30 being at least 40 cm from the ground increases the likelihood that the distance sensor will be able to sense posts sufficiently far away to enable the mobile unit 12 to follow the row 40 of posts accurately. The angling of the distance sensors 30 slightly downwards also increases the likelihood of being able to sense posts sufficiently far away to enable the mobile unit 12 to follow the row 40 of posts accurately, particularly on very uneven terrain where the mobile unit 12 may temporarily be tipped forwards or backwards. It also reduces the likelihood that the distance sensors will point in a direction having an upwards component, even if the mobile unit 12 is temporarily tipped backwards.

For example, posts in rows 40 of crops may be positioned approximately 4 metres apart, and the positioning of the LIDAR sensors may enable detection of objects up to, for example, 20 m from the sensors on flat terrain. This means that, even on very uneven terrain, where the chassis 13 may be temporarily tipped back and forward, and where the uneven terrain may block some of the view ahead and behind the chassis 13, the LIDAR sensors 30 may still be able to detect objects up to 16 m away. This means that the LIDAR sensors would typically have a view of at least 4 posts ahead and behind the mobile unit 12, such that a path for the mobile unit 12 to take can be accurately planned to avoid contacting or impacting the posts or crops.

Although it has been described that the distance sensors in this example are LIDAR sensors, in other examples, the distance sensors may comprise any suitable sensor configured to detect external objects and their distance from the sensor, and may comprise any suitable number of sensors such that external objects can be detected within at least a two-dimensional sector from the front end 70 and the back end 80 of the mobile unit 12.

In this example, the mobile autonomous agricultural system 10 further comprises an attitude sensor 32 (best seen in FIG. 2) disposed on the chassis 13 and configured to determine the attitude of the mobile unit 12 with respect to the horizontal. In this example, the attitude sensor 32 comprises a MEMS gyroscope which is configured to sense deviation of the attitude of the mobile unit 12 from the horizontal. In other examples, the attitude sensor may comprise any type of gyroscopic sensor, or any sensor which can be used to determine the attitude of the mobile unit with respect to the horizontal.

In this example, the controller 20 is configured to control direction of movement of the mobile unit 10 based on distance signals received from the distance sensor to move along (i.e., follow) a row 40 of posts, and to control linear extension and retraction of the linear actuators 26 of the wheels units 14 based on an output from the attitude sensor to maintain a horizontal attitude of the mobile unit 12 and to maintain wheel 18 contact with the ground. In this example, the linear actuators 26 may also be controlled to maintain the horizontal attitude whilst maintaining the mobile unit 12 at a predetermined height from the ground. This improves stability of the mobile unit 12. In examples, where there is no attitude sensor, the suspension assembly may also not comprise a linear actuator, in which case the controller may only control the direction of movement of the mobile unit based on the distance signals. In examples where there are no distance sensors, the controller may control a direction of movement of the mobile unit based on any suitable parameter such as a predetermined trajectory.

In this example, the mobile autonomous agricultural system 10 also comprises four proximity sensors 36 disposed on the chassis 13. The proximity sensors 36 in this example are disposed near the apex of the arch of the chassis 13, with two at the front end 70 of the chassis 13 and two at the back end 80 of the chassis 13. Each proximity sensor 36 points downwards such that it points towards crops on a row 40 of posts when the row 40 is within the arch, such as when the system 10 is moving along the rows 40. The proximity sensors 36 are configured to detect whether the crops and row 40 of posts are within a proximity envelope of the respective proximity sensor 36. In other examples, there may be any suitable number of proximity sensors, such as one, two or more than two.

In this example, the controller 20 receives a proximity signal from the proximity sensors 36 and is configured to identify an end and/or beginning of a row 40 of posts based on the proximity signal. For example, if the proximity signal indicates that there is an object within a predetermined proximity of the proximity sensor 36, the controller 20 may determine that the system 10 is over a row 40, or entering the beginning of a row 40. If the proximity signal indicates that there is no object within the predetermined proximity of the proximity sensor 36, then the controller 20 may determine that the system 10 has reached an end of the row 40 and is exiting the row 40 or is not within the rows 40.

In other examples, there may be no proximity sensor, or the proximity sensor may be disposed in any suitable location on the mobile unit 12. The location at the top of the mobile unit 12 and pointing downwards means that a simple one-dimensional sensor can be used more reliably to detect crops on a row 40 of posts, compared with, for example a proximity sensor at the side and pointing inwards towards the crops and row of posts, since variability in the crop heights can be accommodated within the proximity envelope of the proximity sensor.

In this example, the mobile autonomous agricultural system 10 also comprises a path determination module 58 which is configured to receive distance signals from the distance sensors 30, and to identify a row 40 of posts based on the distance signals. Based on the identified row 40 of posts, the path determination module is configured to generate a motion trajectory for the mobile unit 12 to automatically follow, in order to follow the row 40 of posts autonomously.

In examples where there are no distance sensors, the path determination module may determine a path based on any suitable parameters, or there may be no path determination module, and instead the controller may simply receive a predetermined path to follow based of a predetermined map.

In this example, the controller 20 is configured to control the linear extension of the linear actuator 26 and the direction of travel of the mobile unit 12 based on the generated motion trajectory and based on an output of the attitude sensor 32 in order to autonomously follow the identified row 40 of posts and to maintain a horizontal attitude of the mobile unit 12 whilst maintaining contact of the wheels 18 with the ground.

Ensuring that at least four wheels 18 maintain contact with the ground improves the stability of the mobile unit 12 as well as traction of the mobile unit 12, and improves the accuracy of steering of the mobile unit 12, since the traction of the wheels 18 can be accounted for. Unexpected lifting of any wheel 18 from the ground may result in mis-steering due to unforeseen differences in expected traction from the wheels 18. Ensuring that the mobile unit 12 maintains a horizontal attitude also improves the stability of the system 10, particularly on very uneven ground. The applicant has found that maintaining a horizontal attitude of the mobile unit results in maintaining contact of the wheels 18 with the ground, such that simply by maintaining the horizontal attitude, there is an unexpected benefit of not only improving the stability of the mobile unit 12, but also improving the accuracy of steering of the mobile unit 12. Furthermore, maintaining a horizontal attitude of the mobile unit 12 also ensures that a work envelope of the agricultural units 22 within the mobile unit 12 is maintained relative to the crops, such that the agricultural units 22 can carry out their tasks on the crops on either side of the mobile unit 12 despite any unevenness of the ground.

Figure 4:
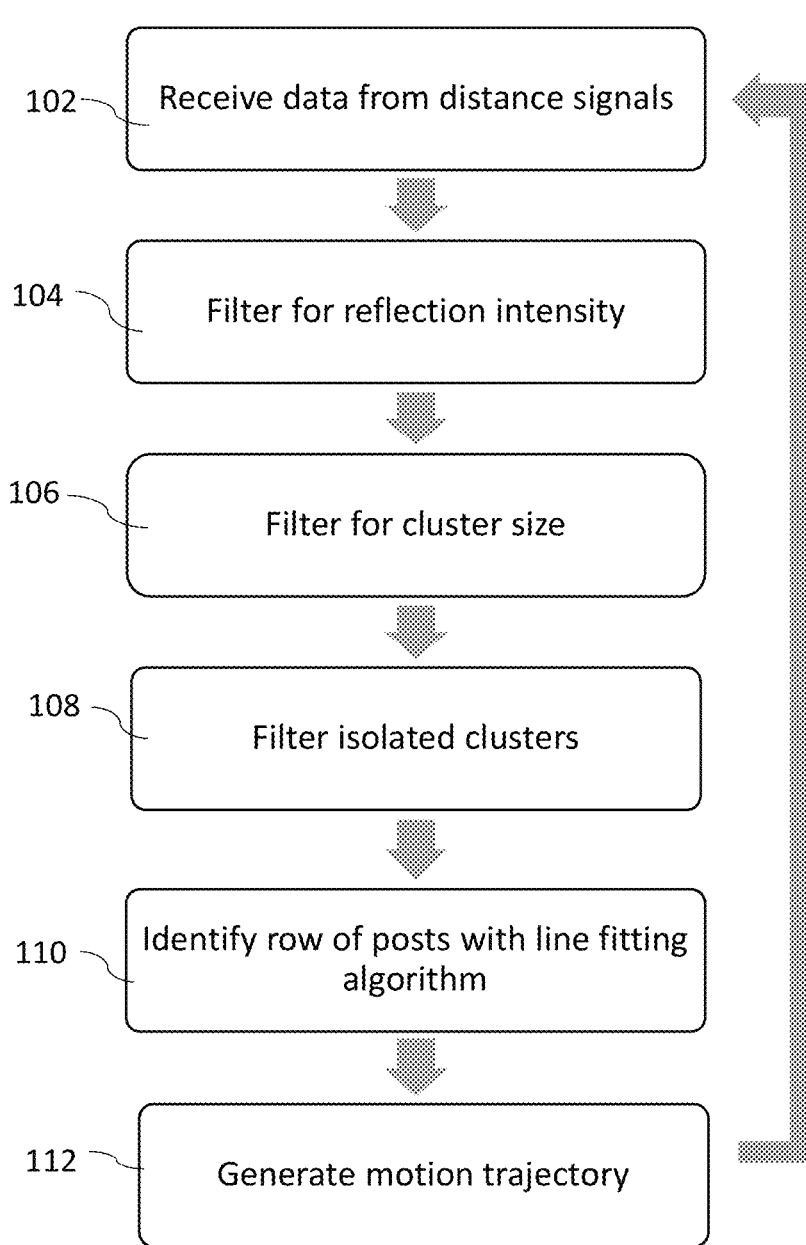
FIG. 4 is a flow chart showing steps of a method of generating a motion trajectory.

FIG. 4 is a flow chart showing steps of a method 100 of the path determination module 60 for generating 112 a motion trajectory for the controller 20 to receive to control the mobile unit 12 to follow a row 40 of crops.

In block 102, the path determination module 60 receives data from distance signals from the distance sensors 30. The data may be in the form of a plurality of data points at which an object is identified. In the example in which the distance sensors 30 are LIDAR sensors, the data points contain information relating to a received reflection intensity from a point and a location of the point in two-dimensional space from the distance sensor 30 (i.e., the distance of the point from the distance sensor 30 and the direction from the distance sensor 30).

In block 104, the path determination module 60 filters the data based on the reflection intensity of the data points. In other words, the path determination module 60 evaluates each data point according to a predefined reflection intensity criterion, and excludes the data point from the data set if the reflection intensity of the data point does not meet the reflection intensity criterion. For example, the predefined reflection intensity criterion may be one or more reflection intensity thresholds. If the data point has a reflection intensity above a first reflection intensity threshold, then the data point may be excluded, and if the reflection intensity of the data point is below the first reflection intensity threshold, then it may not be excluded. In some examples, if the data point has a reflection intensity below a second reflection intensity threshold which is lower than the first reflection intensity threshold, then the data point may be excluded, and if the data point has a reflection intensity above the second reflection intensity threshold, then the data point may not be excluded. Therefore, in examples with both a first reflection intensity threshold and a second intensity threshold, data points may be excluded from the data set if their reflection intensities fall outside of a range defined between the first intensity threshold and the second intensity threshold.

Filtering the data based on reflection intensity can help to filter out noise. For example, the path determination module 60 needs to identify posts in rows 40, but in an agricultural environment, there may be many other objects which could be identified with the distance sensor, including clouds of dust, small bushes and the like.

In block 106, the path determination module 60 filters the data based on data point cluster size. Data point clusters may be identified based on proximity of data points to one another. For example, a data point which is identified as being within a cluster threshold distance from any other data point may be determined to be within a data point cluster with the other data point. This can apply to any number of data points to form a cluster of any size. A location of the cluster may be identified based on any suitable geometric definition such as the geometric centroid.

In other words, the path determination module 60 evaluates each data point according to a predefined cluster size criterion, and excludes the data points in the respective cluster from the data set if the cluster size does not meet the cluster size criterion.

For example, the cluster size criterion may be a range of sizes. If the cluster size falls outside of a range of 10×10 mm and 60×60 mm, the data points from that cluster may be excluded. Therefore, in this example if any dimension of the cluster is larger than 60 mm or smaller than 10 mm, the data points of the cluster may be excluded.

Filtering data point clusters for size also helps to filter out noise from the data which is not related to a post. For example, a bee hive, fly traps, heating or irrigation pipes will likely show a large cluster, which can then be easily eliminated from the data set.

In block 108, the path determination module 60 filters isolated data point clusters from the data. In other words, the path determination module 60 evaluates each data point according to a predefined cluster isolation criterion. For example, the cluster isolation criterion may exclude clusters which are beyond a cluster isolation threshold distance from any other cluster. This will exclude clusters which are so isolated from other clusters as to appear to be outliers in the data set. This thereby further filters noise from the data set which is not related to posts, since it is expected that the posts from rows 40 would be within a predefined distance of one another.

In some examples, there may be no filtering based on reflection intensity, cluster size, or cluster isolation such that the method may move from block 102 directly to block 110 without blocks 104-108. In other examples, there may be filtering based on one or more of these criteria.

In block 110, the method 100 comprises identifying a row 40 of posts with a line fitting algorithm based on the plurality of filtered data points. The line fitting algorithm may generate a best fit line representing the identified row 40 of posts. In some examples the line fitting algorithm may identify several best fit lines, which may represent several different rows 40 of posts.

In this example, the line fitting algorithm may be a Random Sample Consensus (RANSAC) line fitting algorithm. A best fit line may be selected with a highest confidence score (or a lowest estimated error score) from the algorithm, or several best fit lines may be selected based on confidence scores above a confidence threshold (or error scores below an error threshold).

If several different rows 40 of posts are identified with several different best fit lines, the path determination module 60 may select the best fit line representing the row closest to the mobile unit 12, such as a middle line. In such a selection, data points in data point clusters which appear to be inconsistent with the selected best fit line may be excluded from the data set. Inconsistency with the selected best fit line may be determined based on any suitable criterion, such as an error value compared with each best fit line representing each row 40 of posts, and exclusion of the data point cluster if the error value is lower for a different best fit line representing a different row 40 of posts.

In block 112, the path determination module 60 is configured to generate a motion trajectory for the controller 20 to follow, based on the selected best fit line to move towards the best fit line, and to follow the best fit line. In other examples, a suitable motion trajectory for the mobile unit 12 could be generated in any suitable manner.

The method 100 then returns to block 102 to repeat the steps.

In block 112, the motion trajectory may be based on the best fit line of several iterations of the method 100. For example, in each iteration of the method 100, it is likely that the best fit lines will vary such that the best fit line is dynamically changing. Generating the motion trajectory may therefore be based on several iterations of the best fit line and may smooth the best fit line for the motion trajectory, such that there are no sudden changes in motion trajectory for the mobile unit 12. When the motion trajectory is implemented by the controller 20, this results in a smoother movement of the mobile unit 12.

In some examples, the data in block 102 may be received from only the front distance sensor 30. The best fit line is therefore based on the row 40 of posts identified in front of the mobile unit 12. However, there may be occasions where there are not enough posts identified, or the data is insufficient from the front distance sensor 30 to identify a row 40 of posts with an adequate confidence level. In such cases, the method 100 may be repeated with data from the back distance sensor 30 and the motion trajectory may be based on the best fit line which is extrapolated to the front of the mobile unit 12. In other examples, the data received may be from both front and back distance sensors 30 in block 102 at all times. This results in a more accurate best fit line, but also requires more processing power.

Figures 5, 6:
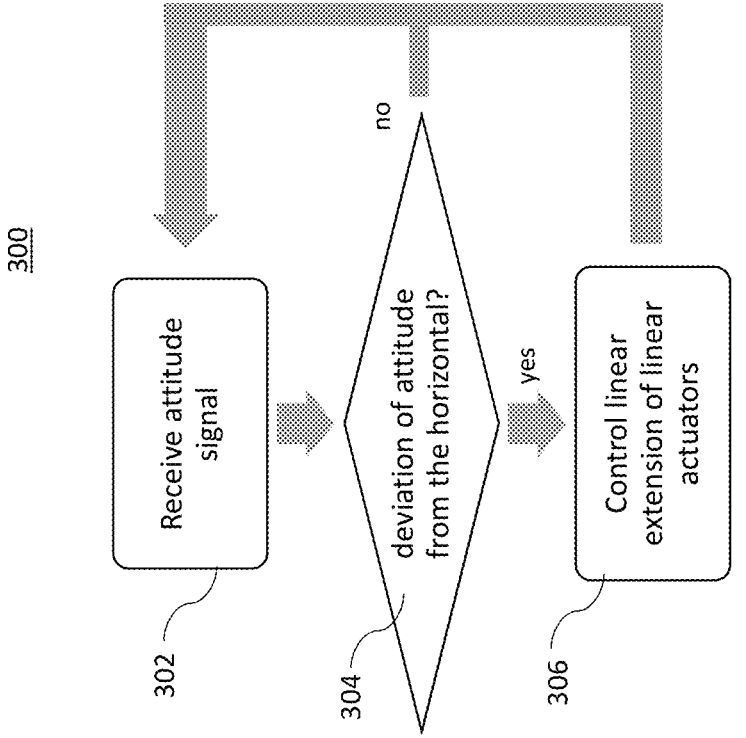
FIG. 5 is a flow chart showing steps of a method of controlling movement of the mobile autonomous agricultural system.
FIG. 6 is a flow chart showing steps of a method of controlling a suspension assembly of the mobile autonomous agricultural system.

FIG. 5 is a flowchart showing steps of a method 200 of controlling the mobile unit 12 to move.

In block 202, the controller 20 receives a proximity signal from the proximity sensor 36.

In block 204, the controller 20 determines the location of the mobile unit 12 based on the proximity signal. For example, if the proximity signal indicates that there is an object within a predetermined proximity of the proximity sensor 36, the controller 20 may determine that the system 10 is over a row 40, or entering the beginning of a row 40. If the proximity signal indicates that there is no object within the predetermined proximity of the proximity sensor 36, then the controller 20 may determine that the system 10 has reached an end of the row 40 and is exiting the row 40 or is not within the rows 40.

In block 206, the controller 20 controls the movement of the mobile unit 12 based on the determined location of the mobile unit 12 in block 204. For example, if the controller 20 determines that the mobile unit 12 is over a row 40 of posts, then it may control the mobile unit 12 according to the motion trajectory, but if the controller 20 determines that the mobile unit 12 is not over a row 40 of posts, it may control the powered mobile unit 12 to move in a direction towards another row 40 of posts, for example adjacent to a previous row 40 or in another tunnel having a plurality of rows. The method 200 then returns to block 202 to repeat.

In block 204, the method 200 may also determine a location of the mobile unit 12 based on a determined location from a previous iteration of the method 200. For example, if the determined location from a previous iteration of the method 200 identified that the mobile unit 12 was over a row 40 of posts, and in the next iteration of the method 200, the proximity signal indicates that there are no crops or objects in proximity to the proximity sensor 36, then the controller 20 may determine in block 204 that the mobile unit 12 is at an end of the row 40 of posts. The controller may then control the mobile unit 12 in block 206 to exit the respective row based on the motion trajectory, and then to control the mobile unit 12 to move towards another different row 40, based on a GPS signal or a predefine map of rows 40.

In another example, if the determined location from a previous iteration identified that the mobile unit 12 was not over a row 40 of posts, and in the next iteration of the method 200, the proximity signal indicates that there are crops or objects in proximity to the proximity sensor 36, then the controller may determine in block 204 that the mobile unit 12 is at the beginning of a row 40, and may therefore control the mobile unit 12 to move into the row according to the motion trajectory.

It will be appreciated that, in examples where there is no proximity sensor, the controller may simply control the movement of the mobile unit based on the received motion trajectory.

FIG. 6 is a flow chart showing steps of a method 300 of controlling linear actuators 26 of each of the wheel units 14 to maintain a horizontal attitude of the mobile unit 12 and to maintain contact of the wheels 18 with the ground.

In block 302, the controller 20 receives an attitude signal from the attitude sensor 32.

In block 304, the controller 20 determines whether there is a deviation of the attitude of the mobile unit 12 from the horizontal based on the attitude signal. If there is no deviation, the method 300 returns to block 302.

If the controller 20 determines that there is deviation of the attitude of the mobile unit 12 from the horizontal, then the method 300 continues to block 306.

In block 306, the controller 20 controls the linear extension of each of the linear actuators 26 based on the determined deviation to return the attitude of the mobile unit 12 to the horizontal. The method returns to block 302 so that the method 300 forms a feedback loop, and the linear actuators 26 are continually controlled to maintain a horizontal attitude of the mobile unit 12 (or as close as possible to horizontal), regardless of the irregularity of the terrain. By controlling the linear actuators 26 to maintain a horizontal attitude of the mobile unit 12, the method 300 also maintains contact of the wheels 18 with the ground.

Although it has been described that the profile of the mobile unit defines an arch with distal ends of the arch fixed to wheels, in other examples, the mobile unit may have any suitable profile, or the arch profile may be inverted so that a portion of the arch at the apex is fixed to wheels and the distal ends extend upwards, away from the wheels and the ground. This can be used in situations where the crops are suspended from above, such that an inner zone between arms of the arch receives the suspended crop, and the crop is accessible to agricultural equipment in the arch from two sides simultaneously. For these examples, and the specific example described above, the longitudinal axis may correspond to the axis of the mobile unit which is configured to be parallel to a row while the controller controls the mobile unit to move along the row.

The maintenance of the horizontal attitude of the mobile unit 12 and the wheel units 14 to steer the mobile unit 12 along the motion trajectory while the mobile unit 12 is in motion are controlled simultaneously in real time.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt the present application extends to the subject-matter described in the following numbered paragraphs (referred to as "Para" or "Paras"):

Para 1. A mobile autonomous agricultural system comprising:

a powered mobile unit extending from a front end to a back end along a longitudinal axis, the powered mobile unit configured for carrying agricultural equipment and, configured to move along rows of posts along the longitudinal axis, the powered mobile unit comprising a chassis supported by wheel units, each wheel unit comprising a wheel with a suspension assembly, wherein the suspension assembly comprises a suspension unit comprising passive spring around a shock absorber coupled to the wheel, and a linear actuator configured to move the suspension unit relative to the chassis of the mobile unit to thereby move the wheel relative to the chassis independently of the suspension unit;

two distance sensors disposed on the powered mobile unit, each configured to sense external objects within two dimensions and the distance of the external objects from the respective distance sensors in opposing front and back directions along the longitudinal axis;

an attitude sensor configured to determine the attitude of the powered mobile unit with respect to the horizontal;

a path determination module configured to:

i. receive distance signals from the distance sensors, ii. identify a row of posts based on the distance signals; and iii. generate a motion trajectory, based on the identified row of posts, for the powered mobile unit to follow; and a controller configured to control the linear extension of the linear actuator of the suspension assembly and the direction of travel of the mobile unit based on motion trajectory of the path determination module and an output of the attitude sensor, to follow the row of posts and to maintain a horizontal attitude of the powered mobile unit whilst maintaining contact of the wheels with the ground.

Para 2. A mobile autonomous agricultural system according to Para 1, wherein the distance sensors are each two-dimensional LIDAR sensors.

Para 3. A mobile autonomous agricultural system according to Para 1 or 2, wherein the distance sensors are disposed on the chassis of the powered mobile unit at least 40 cm from the ground and angled with a downward component.

Para 4. A mobile autonomous agricultural system according to any preceding Para, wherein the path determination module is configured to identify a row of posts from a plurality of data points received from the distance sensors using a line fitting algorithm to derive a best fit line representing the identified row of posts.

Para 5. A mobile autonomous agricultural system according to Para 4, wherein the path determination module generates a motion trajectory based on the best fit line.

Para 6. A mobile autonomous agricultural system according to Para 5, wherein the path determination module is configured to smooth out a dynamically changing best fit line, to generation the motion trajectory.

Para 7. A mobile autonomous agricultural system according to any preceding Para, wherein the path determination module is configured to filter data points from the received signals based on at least one of:

reflection intensity of data points;

isolation of data point clusters from other data points;

consistency of data points with an identified row of posts; and data point cluster size.

Para 8. A mobile autonomous agricultural system according to Para 7, wherein the data points are filtered to exclude those points which exceed a reflection intensity threshold.

Para 9. A mobile autonomous agricultural system according to Para 7 or 8, wherein the data points are filtered to exclude those data points which are in an isolated cluster.

Para 10. A mobile autonomous agricultural system according to any of Paras 7-9, wherein the data points are filtered to exclude those data points which are inconsistent with an identified row of posts.

Para 11. A mobile autonomous agricultural system according to any of Paras 7-10, wherein the data points are filtered to exclude data point clusters which are outside of a cluster size range.

Para 12. A mobile autonomous agricultural system according to any preceding Para, further comprising a proximity sensor disposed on the chassis of the powered mobile unit and is configured to point towards a row of posts along which the chassis is configured to move.

Para 13. A mobile autonomous agricultural system according to Para 12, wherein the proximity sensor is positioned on the chassis at an upper part which is configured to extend above the row of posts when the chassis moves along the row of posts, and wherein the proximity sensor is disposed on the upper part of the powered mobile unit, and configured to point towards the ground, thereby pointing towards the row of posts when the powered mobile unit moves along the row of posts.

Para 14. A mobile autonomous agricultural system according to Para 12 or 13, wherein the controller is configured to identify an end and/or a beginning of the row of posts based on a proximity signal received from the proximity sensor; and when the end of a row is identified, to control the powered mobile unit to exit the respective row based on the motion trajectory and then to control the powered mobile unit to move towards another row based on a GPS signal or a predefined map of rows; and/or when the beginning of a row is identified, to control the powered mobile unit to move into the row according to the motion trajectory.

Para 15. A mobile autonomous agricultural system according to any preceding Para, wherein the suspension assembly further comprises a four-bar linkage comprising a base, an input link, a coupler link and a follower link with the base and the coupler link on opposing sides of the four-bar linkage, wherein the wheel is fixed to the coupler link, and wherein the linear actuator is coupled between the base and the input link such that extension of the linear actuator moves the coupler link, and thereby the wheel, away from the chassis and retraction of the linear actuator moves the coupler link, and thereby the wheel, towards the chassis.

Para 16. A mobile autonomous agricultural system according to any preceding Para, wherein the attitude sensor is a gyroscopic sensor disposed on the chassis of the powered mobile unit and configured to monitor deviation of the attitude of the powered mobile unit from the horizontal.

Para 17. A mobile autonomous agricultural system according to any preceding Para, wherein the controller is configured to control the linear actuators to maintain a centre of the mobile unit at a controlled predetermined height from the ground.

Para 18. A method of controlling a mobile autonomous agricultural system according to any preceding Para, the method comprising:

receiving distance signals from the distance sensors and an output from the attitude sensor, identifying a row of posts based on the distance signals;

generating a motion trajectory, based on the identified row of posts, for the powered mobile unit to follow; and controlling the direction of travel of the mobile unit and the linear extension of the linear actuator of the suspension assembly based on the motion trajectory of the path determination module and the output of the attitude sensor, to follow the row of posts and to maintain a horizontal attitude of the powered mobile unit whilst maintaining contact of the wheels with the ground.

Para 19. A method according to Para 18, wherein identifying the row of posts comprises receiving a plurality of data points from the distance sensors and using a line fitting algorithm to derive a best fit line representing the identified row of posts.

Para 20. A method according to Para 19, wherein the motion trajectory is generated based on the best fit line.

Para 21. A method according to Para 20, wherein generating the motion trajectory comprises smoothing out a dynamically changing best fit line.

Para 22. A method according to any of Paras 18-21, comprising filtering data points from the received signals based on at least one of:

reflection intensity of data points;

isolation of data point clusters from other data points;

consistency of data points with an identified row of posts; and data point cluster size.

Para 23. A method according to Para 22, comprising filtering data points to exclude those points which exceed a reflection intensity threshold.

Para 24. A method according to Para 22 or 23, comprising filtering data points to exclude those data points which are in an isolated cluster.

Para 25. A method according to any of Paras 22-24, comprising filtering data points to exclude those data points which are inconsistent with an identified row of posts.

Para 26. A method according to any of Paras 22-25, comprising filtering data points to exclude those data point clusters which are outside of a cluster size range.

Para 27. A method, according to any of Paras 20-26, of controlling a mobile autonomous agricultural system according to any of Paras 1-17 when appendant to Para 12, the method comprising:

identifying, based on proximity signals received from the proximity sensor, an end and/or a beginning of a row; and when the end of a row has been identified, controlling the powered mobile unit to exit the respective row based on the motion trajectory, and then controlling the powered mobile unit to move towards another row based on a GPS signal or a predefined map of rows; and/or when the beginning of a row is identified, controlling the powered mobile unit to move into the row based on the generated motion trajectory.

Para 28. A method according to any of Paras 18-27, wherein the controller controls the linear actuators to maintain a centre of the mobile unit at a controlled predetermined height from the ground.

What is claimed is:

1. A mobile autonomous agricultural system comprising:

a powered mobile unit extending from a front end to a back end along a longitudinal axis, the powered mobile unit configured for carrying agricultural equipment and, configured to move along rows of posts along the longitudinal axis;

two distance sensors disposed on the powered mobile unit in opposing front and back directions along the longitudinal axis, each distance sensor being configured to sense external objects within two dimensions and a distance of the external objects from the respective distance sensors;

a path determination module configured to:

receive distance signals from the two distance sensors, identify a row of posts in front of the mobile unit based on the distance signals from each of the two distance sensors; and generate a motion trajectory, based on the identified row of posts, for the powered mobile unit to follow; and a controller configured to control a direction of travel of the mobile unit based on the motion trajectory of the path determination module to follow the row of posts.

2. A mobile autonomous agricultural system according to claim 1, wherein the distance sensors are each two-dimensional LIDAR sensors; and/or wherein the distance sensors are disposed on a chassis of the powered mobile unit at least 40 cm from the ground and angled with a downward component.

3. A mobile autonomous agricultural system according to claim 1, wherein the path determination module is configured to identify the row of posts in front of the mobile unit from a plurality of data points received from each of the two distance sensors using a line fitting algorithm to derive a best fit line representing the identified row of posts.

4. A mobile autonomous agricultural system according to claim 3, wherein the path determination module generates the motion trajectory based on the best fit line.

5. A mobile autonomous agricultural system according to claim 4, wherein the path determination module is configured to smooth out a dynamically changing best fit line, to generation the motion trajectory.

6. A mobile autonomous agricultural system according to claim 1, wherein the path determination module is configured to filter data points from the received signals based on at least one of:

reflection intensity of data points;
    isolation of data point clusters from other data points;
    consistency of data points with an identified row of posts; and
    data point cluster size.

7. A mobile autonomous agricultural system according to claim 6, wherein the data points are filtered to exclude those points which exceed a reflection intensity threshold; and/or wherein the data points are filtered to exclude those data points which are in an isolated cluster; and/or
    wherein the data points are filtered to exclude those data points which are inconsistent with an identified row of posts; and/or
    wherein the data points are filtered to exclude data point clusters which are outside of a cluster size range.

8. A mobile autonomous agricultural system according to claim 1, further comprising a proximity sensor disposed on a chassis of the powered mobile unit and is configured to point towards a row of posts along which the chassis is configured to move; and optionally wherein the proximity sensor is positioned on the chassis at an upper part which is configured to extend above the row of posts when the chassis moves along the row of posts, and wherein the proximity sensor is disposed on the upper part of the powered mobile unit, and configured to point towards the ground, thereby pointing towards the row of posts when the powered mobile unit moves along the row of posts.

9. A mobile autonomous agricultural system according to claim 8, wherein the controller is configured to identify an end and/or a beginning of the row of posts based on a proximity signal received from the proximity sensor; and when the end of a row is identified, to control the powered mobile unit to exit the respective row based on the motion trajectory and then to control the powered mobile unit to move towards another row based on a GPS signal or a predefined map of rows; and/or
    when the beginning of a row is identified, to control the powered mobile unit to move into the row according to the motion trajectory.

10. A method of controlling a mobile autonomous agricultural system according to claim 1, the method comprising:

receiving distance signals from the distance sensors,
    identifying a row of posts in front of the mobile unit based on the distance signals;
    generating the motion trajectory, based on the identified row of posts, for the powered mobile unit to follow; and
    controlling the direction of travel of the mobile unit based on the motion trajectory of the path determination module, to follow the row of posts.

11. A method according to claim 10, wherein identifying the row of posts comprises receiving a plurality of data points from the distance sensors and using a line fitting algorithm to derive a best fit line representing the identified row of posts.

12. A method according to claim 10, wherein the motion trajectory is generated based on the best fit line.

13. A method according to claim 12, wherein generating the motion trajectory comprises smoothing out a dynamically changing best fit line.

14. A method, according to claim 12 of controlling a mobile autonomous agricultural system, the method comprising:

identifying, based on proximity signals received from the proximity sensor, an end and/or a beginning of a row; and
    when the end of a row has been identified, controlling the powered mobile unit to exit the respective row based on the motion trajectory, and then controlling the powered mobile unit to move towards another row based on a GPS signal or a predefined map of rows; and/or
    when the beginning of a row is identified, controlling the powered mobile unit to move into the row based on the generated motion trajectory.

15. A method according to claim 10, comprising filtering data points from the received signals based on at least one of:

reflection intensity of data points;
    isolation of data point clusters from other data points;
    consistency of data points with an identified row of posts; and
    data point cluster size.

16. A method according to claim 15, comprising:

filtering data points to exclude those points which exceed a reflection intensity threshold and/or
    filtering data points to exclude those data points which are in an isolated cluster; and/or
    filtering data points to exclude those data points which are inconsistent with an identified row of posts; and/or
    filtering data points to exclude those data point clusters which are outside of a cluster size range.

17. A method according to claim 10, wherein the controller controls at least one linear actuator to maintain a centre of the mobile unit at a controlled predetermined height from the ground.

18. A mobile autonomous agricultural system comprising:

a powered mobile unit extending from a front end to a back end along a longitudinal axis, the powered mobile unit configured for carrying agricultural equipment and, configured to move along rows of posts along the longitudinal axis, the powered mobile unit comprising:
        a chassis supported by wheel units, each wheel unit comprising a wheel with a suspension assembly, wherein the suspension assembly comprises:
            a suspension unit comprising a passive spring around a shock absorber coupled to the wheel,
            a linear actuator configured to move the suspension unit relative to the chassis of the mobile unit to thereby move the wheel relative to the chassis independently of the suspension unit; and
            a lever pivotably connected at a proximal end to the chassis and at a distal end to the suspension unit, the linear actuator being coupled to the chassis and pivotably connected to the lever at a point between the proximal end and the distal end,
    an attitude sensor configured to determine the attitude of the powered mobile unit with respect to the horizontal; and
    a controller configured to control a linear extension of the linear actuator of the suspension assembly based an output of the attitude sensor, to maintain a horizontal attitude of the powered mobile unit whilst maintaining contact of the wheels with the ground.

19. A mobile autonomous agricultural system according to claim 18, wherein the suspension assembly further comprises a four-bar linkage comprising a base, an input link, a coupler link and a follower link with the base and the coupler link on opposing sides of the four-bar linkage, wherein the wheel is fixed to the coupler link, and wherein the linear actuator is coupled between the base and the input link such that extension of the linear actuator moves the coupler link, and thereby the wheel, away from the chassis and retraction of the linear actuator moves the coupler link, and thereby the wheel, towards the chassis.

20. A mobile autonomous agricultural system according to claim 18, wherein the attitude sensor is a gyroscopic sensor disposed on the chassis of the powered mobile unit and configured to monitor deviation of the attitude of the powered mobile unit from the horizontal.

21. A mobile autonomous agricultural system according to claim 18, wherein the controller is configured to control the linear actuators to maintain a centre of the mobile unit at a controlled predetermined height from the ground.

\* \* \* \* \*